Apr. 10, 1923.  
F. T. BURNS  
GRADOMETER  
Filed Mar. 2, 1921  
1,451,387
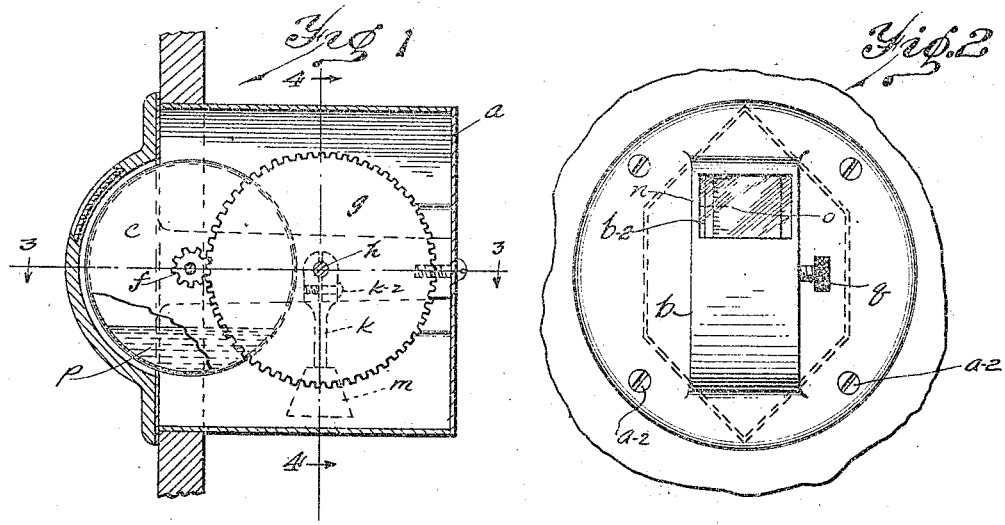
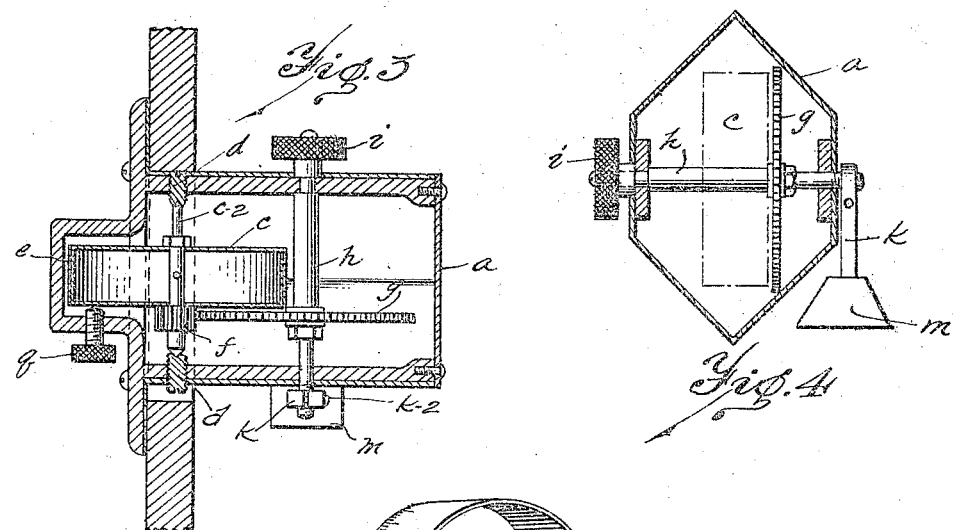
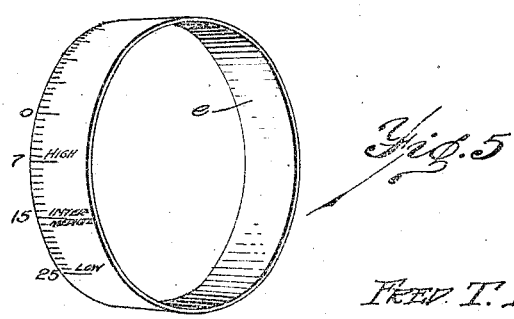
INVENTOR.  
FRED T. BURNS  
BY  
Ralph J. Burton  
ATTORNEY.

Patented Apr. 10, 1923.

1,451,387

UNITED STATES PATENT OFFICE.

FRED T. BURNS, OF DETROIT, MICHIGAN, ASSIGNOR OF ONE-THIRD TO JAY J. BURNS, OF RACE TRACK, MONTANA, AND ONE-THIRD TO FRANK L. FISHER, OF BUTTE, MONTANA.

GRADOMETER.

Application filed March 2, 1921. Serial No. 449,187.

*To all whom it may concern:*

Be it known that I, FRED T. BURNS, a citizen of the United States, residing at Detroit, county of Wayne, and State of Michigan, have invented certain new and useful Improvements in Gradometers, of which the following is a specification.

My invention relates to gradometers adapted for use with motor vehicles, though it is apparent that the same would be adaptable for use with an airplane.

The object is to provide a simple, inexpensive and accurate device for use with motor driven vehicles adapted to register the grade of the path of travel of a moving power driven vehicle.

Previous devices of a somewhat similar nature for accomplishing these same purposes have been proposed and patented, however I have provided a device particularly adapted for easy adjustment so that the device may be installed in any convenient position in any type of vehicle, and quickly and easily adjusted so as to read accurately.

I have also provided means for restraining accidental displacement of the moving parts which would produce incorrect reading due to the body movement incident to road travel.

A further object is the provision of a graduated reading scale or band adapted to indicate the gradient of the course travelled, which in its adaptation here shown is designed for use with motor vehicles, is provided with a series of markings arranged relative the grade markings, adapted to indicate, for the type of car on which the device is intended to be used, the time at which the gears should be shifted.

A further object is the provision of a device adapted to be easily locked at any position.

These and other objects of the invention together with details of construction, will more fully appear from the following specification and appended claims, together with the accompanying drawing, in which:

Fig. 1 is a side elevation showing the casing broken away.

Fig. 2 is a front elevation showing the device fastened in place, for example, on the instrument board of a vehicle.

Fig. 3 is a section taken on line 3—3 of Fig. 1.

Fig. 4 is a section taken on line 4—4 of Fig. 1.

Fig. 5 is a perspective of the indicating band.

In the drawings, let $a$ indicate the box like casing which encloses the moving parts and which is adapted for attachment to a convenient place on a vehicle, as shown in Fig. 2, screws $a^2$ being used. The outer curved face plate $b$ is cut away at $b^2$, and would preferably be provided with a transparent window at such cut away opening. Journalled in the forward end of this box like casing, is a ribbon carrying drum $c$. opposite ends of the pivotally mounted axle of which is received in the bearing ends of a pair of oppositely disposed adjusting screws $d$—$d$. The axle is indicated as $c^2$. The drum is intended to receive removable graduated ribbons or bands, which in the rotation of the drum pass close up under the window $b^2$ in the casing. The ribbon is indicated as $e$. This shaft $c^2$ carries a gear $f$ which is in mesh with a large gear, establishing a ratio for example of eight to one, which large gear, indicated as $g$ is fixed to a freely mounted shaft $h$, journalled in opposite sides of the casing, extending horizontally across the box, projecting beyond the sides thereof. On one end is fixed a thumb nut $i$, by means of which the shaft $h$ may be rotated, and from the other end is suspended a pendulum-like weight, fixed to the shaft, but rotatably adjustable thereon. The weight comprises a split link $k$ provided at its lower end with a bob $m$. The link is threaded at its split end to be received over the threaded end of the shaft $h$ and a tightening screw $k^2$ is used to secure it firmly thereon.

In the operation of the device, the weight of the bob is such as to rotate the shaft $h$ and through the toothed gears $g$ and $f$ rotate the drum. If the weight is so adjusted therefore on the spindle, that the zero of the reading scale band registers on the reading line $n$ marked on the casing or window, any variation in the grade of the roadway travelled by the vehicle in which the device is mounted will be registered on the scale, the weighted bob moving to assume the vertical position.

It will be seen that the device may be adjusted to be used on any type or angle of position of instrument board on which it may be placed. These vary in the different kinds of vehicles, and the bob would be adjusted to compensate for any angle at which the device might rest when in place. This is particularly of advantage when installing the device as it is particularly adapted to be sold as an accessory to be used on different types of vehicles to be easily installed by the purchaser. It would also permit of adjustment to compensate for displacement of parts, wear, et cetera, as in the usual construction of instrument boards it would be possible to reach up behind the board gripping the thumb nut in one hand and holding the weighted bob in the other and adjust the position of the bob on its supporting spindle.

The drum $c$ is constructed so as to carry fluid, such as mercury, which could be poured in through the axle opening or a provided opening in the side thereof, and which would serve to stabilize the mechanism so as to prevent undue oscillation due to slight variations of grade and inequalities in the road surface and the ordinary jar and body movement incident to travel on the road. The liquid content is indicated as $p$. An adjusting or locking screw $q$ is provided adapted to frictionally engage the side of the drum to secure the same in fixed position, when so desired.

Removable bands or ribbons are provided arranged for different types of cars, and they are not necessarily graduated from a zero both ways to twenty-five degrees as shown in the drawing, which it is apparent might be extended if so desired, but the ribbon is also marked to indicate the per cent of grade which the type of car should be able to ascend on a certain gear ratio, for example, if the car at a certain rate of speed, were able to make a seven per cent grade on high gear, and was able to make a fifteen per cent grade on intermediate but at twenty-five should be put in low gear, these marks would be entered on the band opposite the grade figures, to warn the driver as to the shifting of gears. These figures are given not as accurate ones, but merely illustrative of the principle of operation and construction.

It is apparent that this device could be adapted for use on airplanes. In such case the possible grade capable of ascent being greater than with an automobile, the ratio between the gears in the train would vary and the reading scale on the band would be extended to correspond with the possible grade.

What I claim is:

1. In an article of the class described, in combination with a motor vehicle instrument board, a casing fixed to said board, a drum journalled within said casing for rotation which drum bears on its periphery a reading scale discernible through an aperture in the casing wall, a spindle journalled in the casing and projecting at each end beyond the casing wall, a pendulum suspended from one projecting end of the spindle and rotatably adjustable thereon, means operatively connecting said spindle and said drum so the drum will be rotated by the rotation of the spindle when the latter is turned by the pendulum, and means for locking the drum against rotation at any desired position said means being operable externally of the casing.

2. The combination with a motor vehicle instrument board of a gradometer comprising, in combination, a casing rigidly secured to said board, a drum rotatably journalled in said casing and bearing on its periphery a reading scale, a spindle journalled in said casing and projecting at one end through the wall of the casing, a pendulum suspended from the projecting end of the spindle and adapted to rotate the spindle relative to the casing as the inclination of the casing is changed, said pendulum being rotatably adjustable on said spindle, and means operatively connecting the drum with the pendulum controlled spindle so as to be rotated thereby and in proportion to the rotation thereof.

FRED T. BURNS.